US006741080B2

(12) United States Patent
Peterson et al.

(10) Patent No.: US 6,741,080 B2
(45) Date of Patent: May 25, 2004

(54) BUFFERED ION SENSE CURRENT SOURCE IN AN IGNITION COIL

(75) Inventors: Philip Ralph Peterson, Grand Blanc, MI (US); Philip Allen Karau, Grand Blanc, MI (US); Scott B. Kesler, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 169 days.

(21) Appl. No.: 10/042,114

(22) Filed: Oct. 19, 2001

(65) Prior Publication Data

US 2002/0196024 A1 Dec. 26, 2002

Related U.S. Application Data

(60) Provisional application No. 60/299,655, filed on Jun. 20, 2001.

(51) Int. Cl.[7] ........................... F02P 17/00; G01L 23/22

(52) U.S. Cl. ....................... 324/399; 324/380; 324/388; 73/35.08

(58) Field of Search ................................ 324/380, 388, 324/399, 402; 73/35.08

(56) References Cited

U.S. PATENT DOCUMENTS

| | | | | |
|---|---|---|---|---|
| 5,032,774 A | * | 7/1991 | Juzswik | 318/293 |
| 5,444,375 A | * | 8/1995 | Ohsawa et al. | 324/399 |
| 5,777,216 A | | 7/1998 | Van Duyne et al. | 73/116 |
| 5,781,012 A | * | 7/1998 | Yasuda | 324/399 |
| 6,202,474 B1 | * | 3/2001 | Takahashi et al. | 324/378 |
| 6,222,368 B1 | * | 4/2001 | Inagaki et al. | 324/399 |
| 6,275,041 B1 | * | 8/2001 | Okamura et al. | 324/380 |
| 6,360,587 B1 | * | 3/2002 | Noel | 73/35.08 |

* cited by examiner

*Primary Examiner*—Jay Patidar
*Assistant Examiner*—Timothy J. Dole
(74) *Attorney, Agent, or Firm*—Jimmy L. Funke

(57) ABSTRACT

In an ignition coil assembly of an ion sensing ignition system having an ignition coil output, a buffered ion-sense current source circuit is provided and includes a current sensing circuit, the current sensing circuit being disposed so as to be communicated with the ignition coil output and an active current source circuit, the active current source circuit being disposed so as to be communicated with the current sensing circuit and a current measuring device.

18 Claims, 2 Drawing Sheets

BUFFERED ION SENSE CURRENT SOURCE IN AN IGNITION COIL

CROSS-REFERENCE TO RELATED APPLICATIONS

This application claims the benefits of U.S. provisional application No. 60/299,655, filed Jun. 20, 2001 the contents of which are incorporated by reference herein in their entirety.

BACKGROUND OF THE INVENTION

This invention relates generally to ionization detection in an ignition system and more particularly to ionization detection in an ignition system using a buffered ionization sensing current source.

The relationship between spark plug gap ionization and engine misfire is well understood in the automotive industry. As such, it is well known that following a successful ignition electrical conductivity within a spark plug gap increases due to the ionization of hot combustion gases. Thus, if a current, specifically an ionization current, could be generated from the ionization of these hot combustion gases, this ionization current could be used to gather valuable information regarding the combustion process. Measurement of this ionization current could provide information relating to engine misfire, engine knock, spark plug fouling, approximate fuel/air ratios as well as many other combustion characteristics.

As such, ionization current detection in an ignition system is used to determine information regarding the combustion process. As discussed above, when a spark plug sparks, gases surrounding the spark plug gap ignite causing these gases to become ionized and increasing the electrical conductivity within the gap. At this point, application of a voltage across the gap results in a current, specifically an ionization current, which can then be measured. Typically, this voltage is applied using a voltage source and the ionization current is measured via measuring electronics located in the Engine Control Module (ECM) or some other remote location.

In some ion sensing ignition systems, the measuring electronics are remotely located away from the spark plug and the ignition coil, effectively putting the measuring electronics at a different ground potential than the spark plug and the ignition coil. It should be noted that although the measuring electronics and the spark plug and the ignition coil have different ground potentials, they are ohmically communicated with each other through a common system ground. However, because they do not share the same ground voltage potential they effectively do not share a common ground and because the measuring electronics and the spark plug do not share a common ground, the ion sensing system may experience dynamic ground potential differences. When the measuring electronics ground potential changes relative to the spark plug ground potential a small distortion voltage is created with respect to the measuring electronics ground. This small distortion voltage is problematic because the ionization current levels are very small making the system very sensitive to any dynamic ground differences. In fact, because the ionization current levels are so small any distortion can become significant. As an example, this distortion can be especially problematic if the ECM is attempting to extract small amplitude engine knock information from the ionization current.

Currently, there are a few approaches available to resolve the effects created by these dynamic ground potential differences. One approach is to mount the ECM directly to the engine. This approach is proven effective and works to minimize any ground differences between the ECM and the engine. However, this approach can be expensive due to the fact that the ECM would have to survive high engine temperatures and engine vibration levels.

A second approach would be to use differential amplifiers at the input of the ECM. Although this is possible and could be effective, this approach has a few drawbacks. First, the differential amplifier could be expensive and subject to drift with age and temperature. Second, because the ground difference can be both negative and positive the differential amplifier would require a negative power supply. Third, the differential amplifier would have a signal input and a ground sense input requiring additional leads.

Lastly, a third approach would be to put the signal processing circuitry in the ignition coil. This approach should be highly effective and eliminate any potential ground differences. However, this approach could be expensive because it would require communicating the signal information from the ignition coil to the ECM taking into account the varying ground potential differences. Although this information can be communicated using many different methods, such as digital encoding and pulse width encoding, complex logic circuitry would be required in each ignition coil. Because the ignition coil is mounted on the engine, the complex logic circuitry would have to be able to survive high engine temperatures and engine vibration levels. Finally, having this logic circuitry in each coil will tend to limit the signal processing capability due to size, temperature and cost.

Therefore, it is considered advantageous to provide an ionization current detection circuit design that utilizes a buffered ion sense current source at the output of an ion sense ignition coil so as to cause the detected ionization current to not be sensitive to voltage differences between engine ground and ECM ground.

SUMMARY OF THE INVENTION

In an ignition coil assembly of an ion sensing ignition system having an ignition coil output, a buffered ion-sense current source circuit comprising: a current sensing circuit, the current sensing circuit being disposed so as to be communicated with the ignition coil output; and an active current source circuit, the active current source circuit being disposed so as to be communicated with the current sensing circuit and a current measuring device.

BRIEF DESCRIPTION OF THE DRAWINGS

The above discussed and other features and advantages will be appreciated and understood by those skilled in the art from the following detailed description and drawings, wherein like elements are designated by like numerals in the several figures.

Referring now to the drawings.

DESCRIPTION OF A PREFERRED EMBODIMENT

Figure 1:
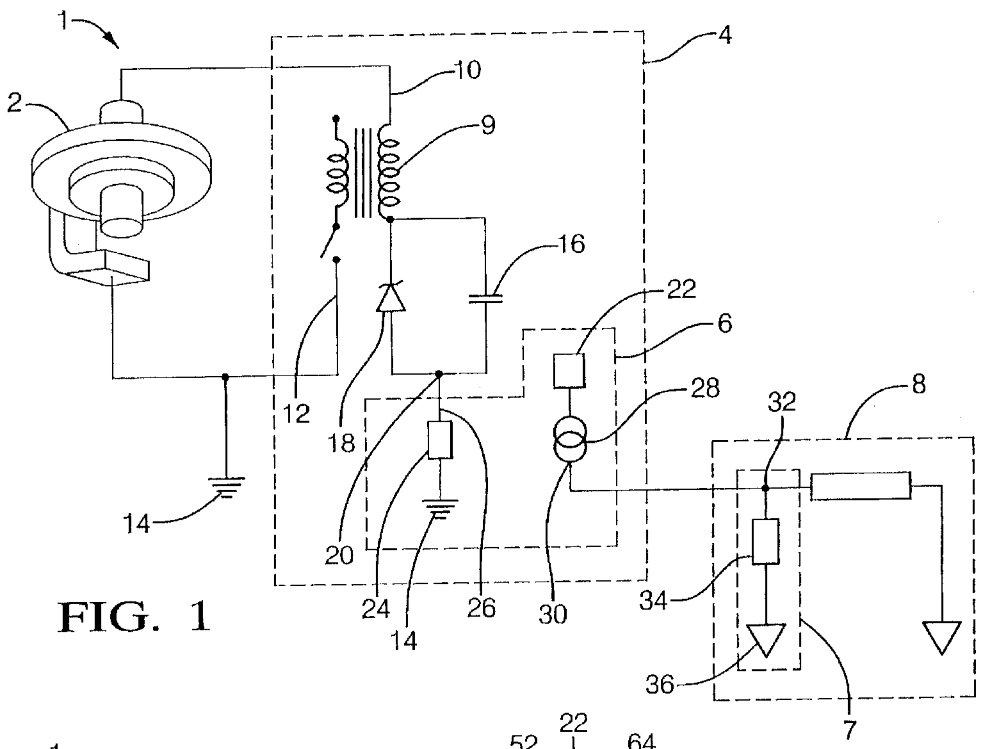
FIG. 1 is a schematic diagram showing a general overview of an ionization current detection circuit that utilizes a buffered ion sense current source in an ignition coil in accordance with an embodiment of the invention.
Figure 2:
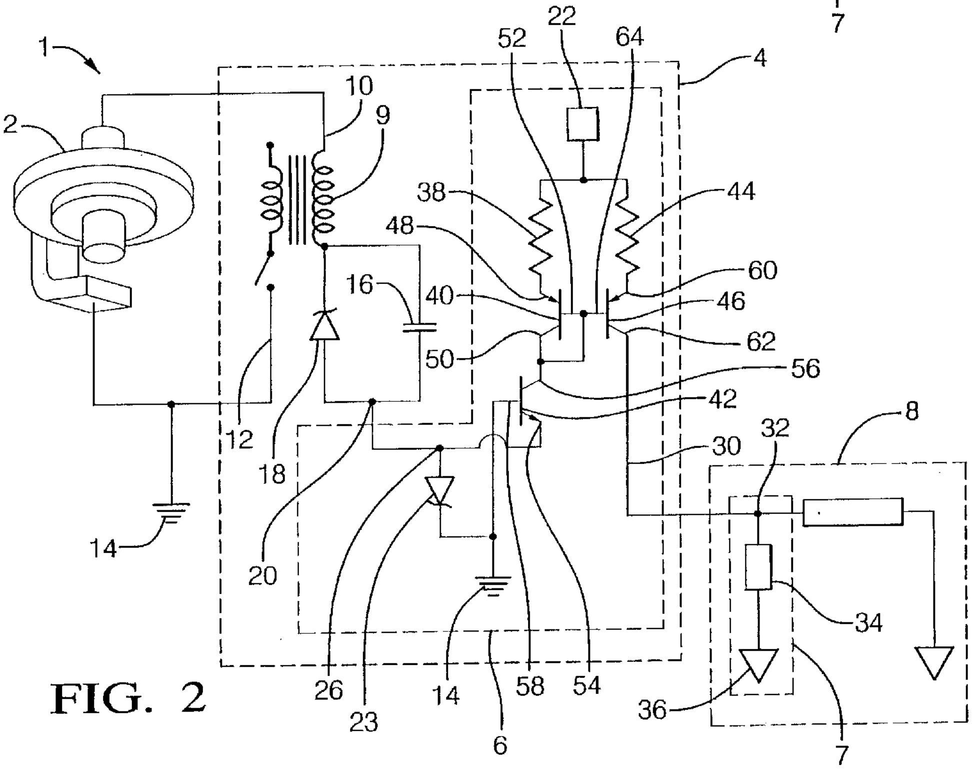
FIG. 2 is a schematic diagram showing one embodiment of an ionization current detection circuit that utilizes a buffered ion sense current source in an ignition coil in accordance with an embodiment of the invention.

Referring to the drawings, FIG. 1 and FIG. 2 show an ion sense ignition system 1 having a spark plug 2, an ignition coil assembly 4 which includes a buffered ion sense current source 6 and an engine control module (ECM) 8 having a current measuring device 7, in accordance with an embodiment of the invention. Ignition coil assembly 4 preferably further includes a coil 9, a coil input 10 communicated with spark plug 2 and coil 9, a first coil output 12 communicated with an engine ground potential 14, a capacitor 16, a diode 18 and an ignition coil output 20. Capacitor 16 and diode 18 are preferably disposed so as to be in parallel with each other and are preferably communicated in series fashion with coil 9 and ignition coil output 20.

In accordance with an embodiment of the invention, buffered ion sense current source 6 preferably includes a secondary power source 22 communicated with engine ground potential 14, a sense diode 23, a current sensing circuit 24 having a sense input 26 and an active current source 28 having a source output 30 communicated in series fashion with current measuring device 7 via an ECM input 32. Current measuring device 7 preferably includes an ECM load resistor 34 communicated in series fashion with ECM input 32 and an electronic ground potential 36. Current sensing circuit 24 preferably includes a sense resistor 38, a first sense transistor 40 and a second sense transistor 42. First sense transistor 40 preferably includes a first sense emitter 48, a first sense collector 50 and a first sense base 52. Second sense transistor 42 preferably includes a second sense emitter 54, a second sense collector 56 and a second sense base 58. Active current source 28 preferably includes a source resistor 44 and a first source transistor 46 having a first source emitter 60, a first source collector 62 and a first source base 64.

In accordance with an embodiment of the invention, sense resistor 38 is communicated with secondary power source 22 and first sense emitter 48 in a series fashion. First sense collector 50 is preferably communicated with first sense base 52 and second sense collector 56. Second sense emitter 54 is preferably communicated with sense input 26 which is further communicated with engine ground potential 14 through sense diode 23. In accordance with an embodiment of the invention, sense diode 23 is preferably disposed such that the cathode of sense diode 23 is communicated with the engine ground potential 14 and the anode of sense diode 23 is communicated with sense input 26 Second sense base 58 is preferably communicated with engine ground potential 14. Also in accordance with an embodiment of the invention, source resistor 44 is communicated with secondary power source 22 and first source emitter 60 in a series fashion. First source base 64 is preferably communicated with first sense base 52. First source collector 62 is preferably communicated with source output 30.

When the ignition system 1 is engaged, an ignition spark occurs across spark plug 2 causing a spark current to flow from spark plug 2 to coil 9 via coil input 10. The spark current then flows from coil 9 through capacitor 16 out of ignition coil output 20 into sense input 26 and through sense diode 23 to engine ground potential 14. This causes capacitor 16 to charge to a voltage potential which is determined by diode 18 and once the ignition spark is complete, capacitor 16 provides a voltage potential across spark plug 2. This also causes an ion current to flow from engine ground potential 14 through secondary power source 22 through sense resistor 38 through first sense transistor 40 through second sense transistor 42 through capacitor 16 through coil 9 and through spark plug 2 and back to engine ground potential 14.

As this ion current flow increases, the voltage potential at first sense emitter 48 is reduced causing the voltage potential at first sense base 52 to be reduced. Because first sense base 52 and first source base 64 are communicated with each other, the voltage potential reduction at first sense base 52 is applied to first source base 64. This has the effect of activating, or "turning on", first source transistor 46 by increasing the voltage potential ratio between first source emitter 60 and first source base 64, otherwise known as the emitter to base voltage of first source transistor 46. Once the first source transistor 46 becomes activated, a collector current, or source current begins to flow out of first source collector 62 and out of source output 30 into ECM input 32. The source current flowing out of first source collector 62 increases until the voltage potential at first source emitter 60 essentially matches the voltage potential at first sense emitter 48. Because of this, the source current flowing through source resistor 44 and first source transistor 46 will always be proportional to the ion current flowing through sense resistor 38 and first sense transistor 40.

Figure 3:
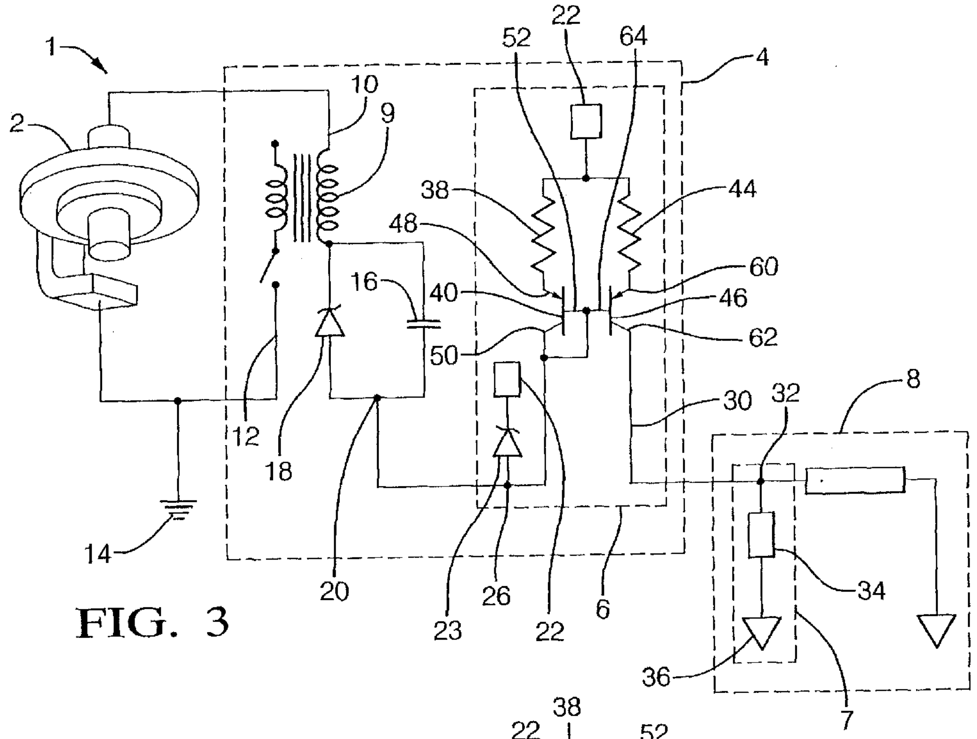
FIG. 3 is a schematic diagram showing a first alternative embodiment of an ionization current detection circuit that utilizes a buffered ion sense current source in an ignition coil in accordance with an alternative embodiment of the invention.

Referring to FIG. 3 an alternative embodiment is shown and is as described below. In accordance with an embodiment of the invention, the alternative embodiment shown in FIG. 3 is substantially the same as the preferred embodiment of FIG. 2 with the following two exceptions. First, second sense transistor 42 has been removed and first sense collector 50 has been communicated with sense input 26. Second, sense input 26 is further communicated with secondary power source 22 through sense diode 23, wherein sense diode 23 is disposed such that the cathode of sense diode 23 is communicated with secondary power source 22 and the anode of sense diode 23 is communicated with sense input 26.

In accordance with an embodiment of the invention, the theory of operation for the alternative embodiment as shown in FIG. 3 is the same as the theory of operation for the preferred embodiment as shown in FIG. 2 and described above with the exception that when the ignition system 1 is engaged, an ignition spark occurs across spark plug 2 causing a spark current to flow from spark plug 2 to coil 9 via first coil input 10. The spark current then flows from coil 9 through capacitor 16 out of ignition coil output 20 into sense input 26 and through sense diode 23 to secondary power source 22.

In accordance with an embodiment of the invention, the relationship between the source current flow and the ion current flow is defined by the following equation:

$$I3=(R2/R3)*I2,$$

where:

I3=source current flow;

I2=ion current flow;

R2=sense resistor 38; and

R3=source resistor 44.

The source current is allowed to flow into current measuring device 7 via ECM input 32 through ECM load resistor 34 and into electronic ground potential 36. The voltage potential across the ECM load resistor 34 can then be measured and used to calculate the source current. The relationship between the voltage potential across the ECM load resistor 34 and the source current is defined by Ohms Law and is given by the following equation:

$$V_L = R_L I_S,$$

where:

$I_S$=source current;

$V_L$=Voltage potential across the ECM load resistor 34; and $R_L$=Value of the ECM load resistor 34 in ohms.

In accordance with an embodiment of the invention, the source current flowing through ECM load resistor 34 may be measured using any suitable measuring device known in the art and suitable to the desired end purpose. Also, the voltage potential across the ECM load resistor 34 may be measured using any suitable measuring device known in the art and suitable to the desired end purpose.

Figure 4:
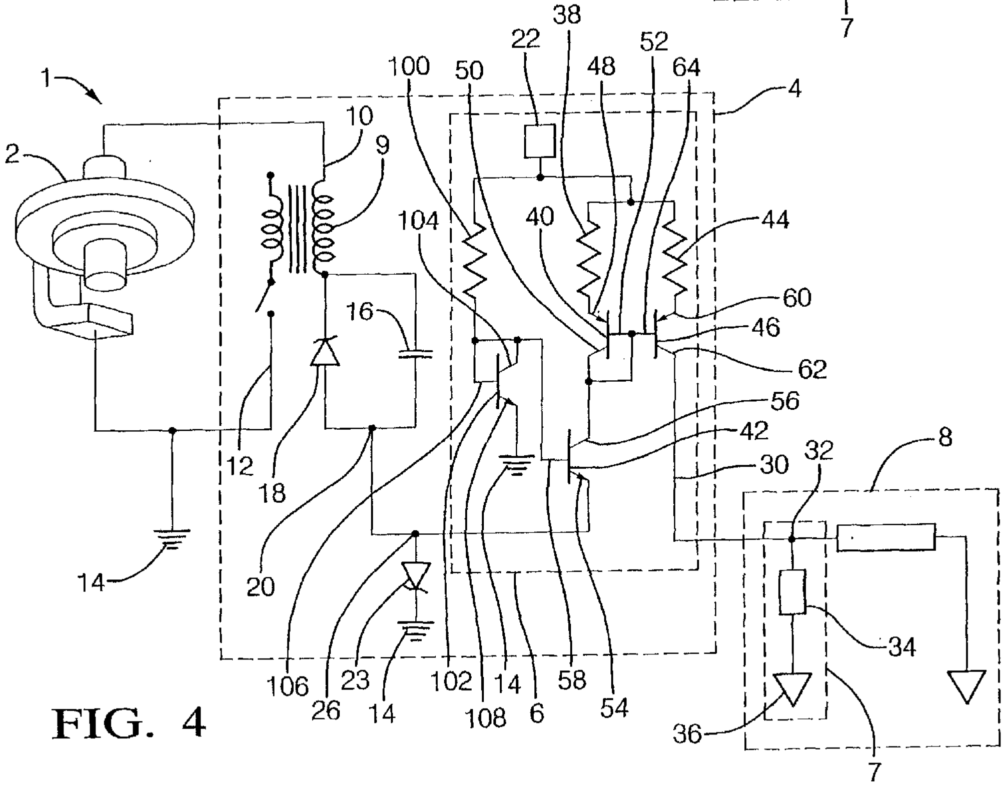
FIG. 4 is a schematic diagram showing a second alternative embodiment of an ionization current detection circuit in integrated circuit form that utilizes a buffered ion sense current source in an ignition coil in accordance with an alternative embodiment of the invention.

In accordance with an alternative embodiment of the invention, it is considered within the scope of the invention that buffered ion-sense current source 6 may be implemented in integrated circuit form. Referring to FIG. 4, a buffered ion-sense current source 6 implemented in integrated circuit form is illustrated and includes an IC resistor 100 and a third sense transistor 102, wherein third sense transistor 102 includes a third sense collector 104, a third sense base 106 and a third sense emitter 108. In this case, third sense collector 104 is preferably communicated with third sense base 106 and second sense base 58. Third sense base 106 is preferably communicated with secondary power source 22 through IC resistor 100 and third sense emitter 108 is preferably communicated with engine ground potential 14. This configuration serves to maintain the voltage potential at second sense emitter 54 at or above ground potential.

In accordance with an embodiment of the invention, IC resistor 100 may be any resistor value known in the art and suitable to the desired end purpose.

In accordance with an embodiment of the invention, sense diode 23 is preferably a zener diode and may be any zener diode known in the art and suitable to the desired end purpose. In addition, sense diode 23 may be any diode known in the art and suitable to the desired end purpose. It is considered within the scope of the invention that the ratio between the source current flow and the ion current flow may be increased or decreased in magnitude by choosing the values, in ohms, of the sense resistor 38 and the source resistor 44, wherein the relationship between the source current flow and the ion current flow is defined by the above equation. It is further considered within the scope of the invention that first sense transistor 40 and first source transistor 46 may be chosen so as to achieve a desired ratio between first sense emitter 48 and first source emitter 60.

In accordance with an embodiment of the invention, buffered ion-sense current source 6 may be disposed so as to be internal or external to ignition coil assembly 4. It is also considered within the scope of the invention that buffered ion-sense current source 6 may be disposed so as to be internal and external to the ignition coil assembly 4 such that a portion of buffered ion-sense current source 6 is disposed internal to ignition coil assembly 4 and a portion of buffered ion-sense current source 6 is disposed external to ignition coil assembly 4.

In accordance with an embodiment of the invention, the ratio between the area of first sense emitter 48 and the area of first source emitter 60 may be selected so as to control the ratio between the source current flow and the ion current flow. Alternatively, it is considered within the scope of the invention that sense resistor 38 and source resistor 44 may be removed and first sense transistor 40 and first source transistor 46 may be chosen so as to achieve a desired end purpose.

In accordance with an embodiment of the invention, current measuring device 7 may be any current measuring device or circuitry known in the art and suitable to the desired end purpose. In addition, although current measuring device 7 is represented here as being disposed within ECM 8, it is considered within the scope of the invention that current measuring device 7 may be disposed so as to be separate from ECM 8.

In accordance with an embodiment of the invention, sense resistor 38 may be of any resistor type and any resistor value known in the art and suitable to the desired end purpose.

In accordance with an embodiment of the invention, first sense transistor 40 and first source transistor 46 may be any PNP transistor known in the art and suitable to the desired end purpose. Also, second sense transistor 42 and third sense transistor 102 may be any NPN transistor known in the art and suitable to the desired end purpose.

In accordance with an embodiment of the invention, secondary power source 22 may be any power source known in the art and suitable to the desired end purpose, such as a battery. In addition, second sense base 58 may be communicated with a positive voltage level or a negative voltage level as desired.

In accordance with an embodiment of the invention, buffered ion sense current source 6 is shown being used with an ignition coil assembly 4 that uses an ion biasing circuit composed of diode 18 and capacitor 16. It is within the scope of the invention that buffered ion sense current source 6 may be used with other ignition coil assemblies 4 known in that art that use other biasing circuit designs.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. In an ignition coil assembly of an ion sensing ignition system having an ignition coil output, a buffered ion-sense current source circuit comprising:

a current sensing circuit, said current sensing circuit being disposed so as to be communicated with said ignition coil output; and an active current source circuit, said active current source circuit being disposed so as to be communicated with said current sensing circuit and a current measuring device; and wherein said current sensing circuit includes a sense resistor and a first sense transistor wherein said first sense transistor includes a first sense emitter communicated with said sense resistor, a first sense collector and a first sense base directly communicated with said first sense collector.

2. The buffered ion-sense current source of claim 1, wherein said first sense transistor is a PNP transistor.

3. The buffered ion-sense current source of claim 1, wherein said first sense collector is communicated with said ignition coil output.

4. The buffered ion-sense current source of claim 1, wherein said current sensing circuit includes a second sense transistor having a second sense emitter, a second sense collector and a second sense base, wherein said second sense collector is communicated with said first sense collector.

5. The buffered ion-sense current source of claim 4, wherein said second sense transistor is an NPN transistor.

6. The buffered ion-sense current source of claim 1 further comprising a sense diode, wherein said sense diode is disposed so as to be communicated with said ignition coil output and an engine ground potential.

7. The buffered ion-sense current source of claim 6, wherein said sense diode is a zener diode.

8. The buffered ion-sense current source of claim 1, further comprising a sense diode wherein said sense diode is disposed such that a cathode thereof is communicated with said ignition coil output and a secondary power source.

9. The buffered ion-sense current source of claim 8, wherein said secondary power source is a battery.

10. The buffered ion-sense current source of claim 8, wherein said sense diode is a zener diode.

11. The buffered ion-sense current source of claim 1, wherein said active current source circuit includes a source resistor and a first source transistor, said first source transistor having a first source emitter communicated with said source resistor, a first source collector communicated with said current measuring device and a first source base.

12. The buffered ion-sense current source of claim 11, wherein said first source transistor is a PNP transistor.

13. The buffered ion-sense current source of claim 11, wherein said active current source circuit includes a source resistor and wherein said current sensing circuit includes a sense resistor, said source resistor and said sense resistor being communicated with a secondary power source.

14. The buffered ion-sense current source of claim 13, wherein said secondary power source is a battery.

15. The buffered ion-sense current source of claim 1, wherein said current sensing circuit includes a first sense transistor having a first sense base and wherein said active current source circuit includes a first source transistor having a first source base, wherein said first sense base is communicated with said first source base.

16. In an ignition coil assembly of an ion sensing ignition system having an ignition coil output, a buffered ion-sense current source circuit comprising:

a current sensing circuit, said current sensing circuit being disposed so as to be communicated with said ignition coil output;

an active current source circuit, said active current source circuit being disposed so as to be communicated with said current sensing circuit and a current measuring device;

wherein said current sensing circuit includes a sense resistor and a first sense transistor, wherein said first sense transistor includes a first sense emitter communicated with said sense resistor, a first sense collector and a first sense base communicated with said first sense collector;

wherein said current sensing circuit includes a second sense transistor having a second sense emitter, a second sense collector and a second sense base, wherein said second sense collector is communicated with said first sense collector; and wherein said second sense emitter is communicated with said ignition coil output and wherein said second sense base is communicated with an engine ground potential.

17. In an ignition coil assembly of an ion sensing ignition system having an ignition coil output, a buffered ion-sense current source circuit comprising:

a current sensing circuit, said current sensing circuit being disposed so as to be communicated with said ignition coil output; and an active current source circuit, said active current source circuit being disposed so as to be communicated with said current sensing circuit and a current measuring device;

wherein said current sensing circuit includes a sense resistor and a first sense transistor wherein said first sense transistor includes a first sense emitter communicated with said sense resistor, a first sense collector and a first sense base directly communicated with said first sense collector wherein said current sensing circuit includes a second sense transistor having a second sense emitter, a second sense collector and a second sense base, wherein said second sense collector is communicated with said first sense collector; and wherein said current sensing circuit includes a third sense transistor having a third sense emitter, a third sense collector and a third sense base, wherein said third sense collector and said third sense base is communicated with said second sense base and wherein said third sense emitter is communicated with an engine ground potential.

18. The buffered ion-sense current source of claim 17, wherein said current sensing circuit includes an IC resistor wherein said IC resistor is communicated with said third sense base and a secondary power source.

* * * * *